United States Patent
Lection et al.

(10) Patent No.: US 8,631,324 B2
(45) Date of Patent: Jan. 14, 2014

(54) RUNNING CONTENT EMITTERS NATIVELY ON LOCAL OPERATING SYSTEM

(75) Inventors: David B. Lection, Raleigh, NC (US); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2167 days.

(21) Appl. No.: 11/033,709

(22) Filed: Jan. 12, 2005

(65) Prior Publication Data

US 2006/0155682 A1    Jul. 13, 2006

(51) Int. Cl.
G06F 17/00    (2006.01)

(52) U.S. Cl.
USPC .......................................... 715/273; 715/205

(58) Field of Classification Search
USPC ......... 715/500, 526, 200, 203, 221, 222, 223, 715/224, 225, 205, 273; 709/203
See application file for complete search history.

(56) References Cited

U.S. PATENT DOCUMENTS

| | | | |
|---|---|---|---|
| 6,327,628 B1 | 12/2001 | Anuff et al. | |
| 6,438,594 B1 | 8/2002 | Bowman-Amuah | |
| 6,442,529 B1 | 8/2002 | Krishan et al. | |
| 6,502,076 B1 * | 12/2002 | Smith | 705/14 |
| 6,546,554 B1 | 4/2003 | Schmidt et al. | |
| 6,735,585 B1 * | 5/2004 | Black et al. | 707/3 |
| 6,878,067 B2 * | 4/2005 | Blanco | 463/43 |
| 6,918,118 B2 | 7/2005 | Standridge et al. | |
| 6,968,512 B2 * | 11/2005 | Duxbury | 715/847 |
| 7,058,698 B2 * | 6/2006 | Chatterjee et al. | 709/218 |
| 7,085,807 B2 * | 8/2006 | Simpson et al. | 709/203 |
| 7,103,556 B2 * | 9/2006 | Del Rey et al. | 705/1 |
| 7,146,563 B2 * | 12/2006 | Hesmer et al. | 715/507 |
| 7,231,267 B2 * | 6/2007 | Bournas et al. | 700/91 |
| 7,240,067 B2 * | 7/2007 | Timmons | 707/101 |
| 7,240,280 B2 * | 7/2007 | Jolley et al. | 715/234 |
| 7,277,924 B1 * | 10/2007 | Wichmann et al. | 709/217 |
| 7,281,217 B2 * | 10/2007 | Choudhary et al. | 715/764 |
| 7,624,160 B2 * | 11/2009 | Henderson et al. | 709/219 |
| 7,660,868 B1 | 2/2010 | Kembel et al. | |
| 7,673,030 B2 | 3/2010 | Hite et al. | |
| 7,734,684 B2 | 6/2010 | Zeng et al. | |
| 7,774,323 B2 * | 8/2010 | Helfman | 707/694 |
| 7,930,364 B2 * | 4/2011 | Ramaswamy et al. | 709/218 |
| 8,090,702 B2 * | 1/2012 | Howard et al. | 707/707 |

(Continued)

OTHER PUBLICATIONS

Donnelly et al., Community Portals Through Communitization, ACM 2003, pp. 9-14.*

(Continued)

*Primary Examiner* — Cong-Lac Huynh
(74) *Attorney, Agent, or Firm* — Marcia L. Doubet

(57) ABSTRACT

Techniques for running content emitters natively on a local operating system, by executing a local executive as a native application on the target operating system. In some embodiments, a content emitter such as a portlet preferably invokes, by its normal inclusion mechanism, a markup emitter directed toward the native user interface environment. The markup streams created by locally-executing portlets are collected by the local executive, but instead of being combined into a browser-based markup stream as in the prior art, one or more windows represented by the markup streams is/are created for rendering with the native operating system. An association is maintained between the created window and the portlet(s) emitting content for that window, and controls can be created and valued for the window using this association. In other embodiments, the content emitters execute remotely and deliver content that is adapted for native rendering.

44 Claims, 16 Drawing Sheets

(56) References Cited

U.S. PATENT DOCUMENTS

| | | | |
|---|---|---|---|
| 2001/0009016 A1 | 7/2001 | Hofmann et al. | |
| 2001/0034771 A1 | 10/2001 | Hütsch et al. | |
| 2002/0005867 A1 | 1/2002 | Gvily | |
| 2002/0067370 A1 | 6/2002 | Forney et al. | |
| 2002/0112090 A1 | 8/2002 | Bennett et al. | |
| 2002/0147729 A1* | 10/2002 | Balfour | 707/104.1 |
| 2002/0152114 A1 | 10/2002 | Shumaker et al. | |
| 2002/0152279 A1* | 10/2002 | Sollenberger et al. | 709/217 |
| 2002/0194267 A1 | 12/2002 | Flesner et al. | |
| 2003/0023953 A1 | 1/2003 | Lucassen et al. | |
| 2003/0048286 A1 | 3/2003 | Lal | |
| 2003/0055624 A1* | 3/2003 | Fletcher et al. | 704/2 |
| 2003/0163513 A1* | 8/2003 | Schaeck et al. | 709/201 |
| 2004/0001565 A1 | 1/2004 | Jones et al. | 375/354 |
| 2004/0005923 A1* | 1/2004 | Allard et al. | 463/35 |
| 2004/0054689 A1* | 3/2004 | Salmonsen et al. | 707/104.1 |
| 2004/0054749 A1* | 3/2004 | Doyle et al. | 709/217 |
| 2004/0093587 A1 | 5/2004 | Sesma | |
| 2004/0093608 A1* | 5/2004 | Sprogis | 719/327 |
| 2004/0104947 A1 | 6/2004 | Schmitt | |
| 2004/0107404 A1 | 6/2004 | Burns et al. | |
| 2004/0122971 A1* | 6/2004 | Joshi et al. | 709/236 |
| 2004/0172596 A1 | 9/2004 | Ramani et al. | |
| 2004/0181749 A1* | 9/2004 | Chellapilla et al. | 715/505 |
| 2004/0199392 A1 | 10/2004 | Khatri et al. | |
| 2004/0205534 A1* | 10/2004 | Koelle | 715/507 |
| 2005/0005243 A1* | 1/2005 | Olander et al. | 715/747 |
| 2005/0010634 A1* | 1/2005 | Henderson et al. | 709/201 |
| 2005/0015500 A1* | 1/2005 | Batchu et al. | 709/228 |
| 2005/0015742 A1* | 1/2005 | Wood et al. | 717/101 |
| 2005/0021694 A1* | 1/2005 | Yuan | 709/220 |
| 2005/0050453 A1* | 3/2005 | Barnabei | 715/513 |
| 2005/0119910 A1* | 6/2005 | Schneider | 705/1 |
| 2005/0160155 A1* | 7/2005 | Geekee et al. | 709/220 |
| 2005/0223412 A1* | 10/2005 | Nadalin et al. | 726/3 |
| 2005/0235224 A1* | 10/2005 | Arend et al. | 715/792 |
| 2005/0240857 A1* | 10/2005 | Benedict et al. | 715/500 |
| 2006/0004913 A1* | 1/2006 | Chong | 709/217 |
| 2006/0004923 A1* | 1/2006 | Cohen et al. | 709/228 |
| 2006/0015846 A1* | 1/2006 | Fraleigh et al. | 717/109 |
| 2006/0026557 A1 | 2/2006 | Petri | |
| 2006/0036682 A1* | 2/2006 | Fletcher et al. | 709/203 |
| 2006/0036969 A1* | 2/2006 | Guido et al. | 715/804 |
| 2006/0041637 A1* | 2/2006 | Jerrard-Dunne | 709/219 |
| 2006/0047728 A1* | 3/2006 | Kim et al. | 707/205 |
| 2006/0053411 A1* | 3/2006 | Takamiya | 717/115 |
| 2006/0080612 A1* | 4/2006 | Hayes et al. | 715/742 |
| 2006/0085500 A1* | 4/2006 | Allamaraju et al. | 709/203 |
| 2006/0168512 A1* | 7/2006 | Wilson et al. | 715/513 |
| 2006/0190807 A1* | 8/2006 | Tran | 715/500 |
| 2006/0212798 A1 | 9/2006 | Lection et al. | |
| 2006/0225094 A1* | 10/2006 | Facemire et al. | 725/45 |
| 2006/0244839 A1 | 11/2006 | Glatron et al. | |
| 2008/0052617 A1* | 2/2008 | Guido et al. | 715/246 |

OTHER PUBLICATIONS

Bellas et al., A Flexible Framework for Engineering "My" Portals, ACM 2004, pp. 234-243.*

Polgar et al., Building and Managing Enterprise Wide Web Portals—Tutorial, Google Jun. 2005, pp. 87-108.*

Cardone et al., Using XForms to Simplify Web Programming, ACM May 2005, pp. 215-224.*

Bellas et al., A Flexible Framework for Engineering "My" Portals, ACM May 2004, pp. 234-243.*

Schaeck, WebSphere Portal Server and Web Services Whitepaper, Google 2001, pp. 1-22.*

Schaeck, WebSphere Portal Server and Web Services Whitepaper, Google 2001WW, pp. 1-22.*

Weinreich et al., Enhancing Presentation Level Integration of Remote Applications and Services in Web Portals, IEEE 2005, pp. 1-8.*

Weinsberg et al., *A Programming Model and System Support for Disconnected-Aware Applications on Resource-Constrained Devices*, Proceedings of the 24$^{th}$ International Conference on software Engineering, 2002 (ICSE 2002), pp. 374-384.

*Abstraction of Local Operating Systems*, Research Disclosure n448, Aug. 2001, Art.98, p. 1374.

Diaz, Angel Luis, et al. Web Services for Remote Portals (WSRP), International Business Machines Corporation, Jan. 21, 2002, Dec. 7, 2004, pp. 1-22, <http://www-128.ibm.com/developerworks/webservices/library/ws-wsrp/index.html>.

Panayiotou, et al., "mPersona. Personalized Portals for the Wireless User: An Agent Approach", Kluwer Academic Publishers, 2004, pp. 663-677.

Rodrigues et al., "Managing Large Scale Virtual Environments Using Portals", ACM, 2004, pp. 459-462.

Stepanian et al., "Inlining Java Native Calls At Runtime", ACM, 2005, pp. 121-131.

Johnson, et al., "A Scalability Study of Web-Native Information Visualization", ACM, 2008, pp. 163-168.

David B. Lection et al., U.S. Appl. No. 11/034,521, filed Jan. 12, 2005, Office Action, Jun. 23, 2011, 18 pages.

Abdelnur, A. Hepper, S. Portlet Specification, Version 1.0, Aug. 26, 2003. p. 17.

David B. Lection et al., U.S. Appl. No. 11/034,521, filed Jan. 12, 2005, Final Office Action, Oct. 5, 2010, 40 pages.

Vecchio, et al., "Evaluating Grid Portal Security", 2006, National Science Foundation, pp. 1-14.

David B. Lection et al., U.S. Appl. No. 11/034,521, filed Jan. 12, 2005, Office Action, Jan. 20, 2011, 8 pages.

Feldman et al., "GW_ADA/ED: Free ADA 83 Development Environments for IBM PC-Compatible and Apple Macintosh Computers", ACM, 1995, pp. 446-454.

David B. Lection et al., U.S. Appl. No. 11/034,521, filed Jan. 12, 2005, Office Action, Dec. 30, 2011, 24 pages.

David B. Lection et al., U.S. Appl. No. 11/034,521, filed Jan. 12, 2005, Office Action, May 2, 2008, 20 pages.

David B. Lection et al., U.S. Appl. No. 11/034,521, filed Jan. 12, 2005, Office Action, Oct. 28, 2008, 20 pages.

David B. Lection et al., U.S. Appl. No. 11/034,521, filed Jan. 12, 2005, Office Action, Apr. 23, 2009, 24 pages.

David B. Lection et al., U.S. Appl. No. 11/034,521, filed Jan. 12, 2005, Office Action, Aug. 21, 2009, 21 pages.

David B. Lection et al., U.S. Appl. No. 11/034,521, filed Jan. 12, 2005, Office Action, Apr. 2, 2010, 25 pages.

Castle, Bryan, "Introduction to Web Services for Remote Portlets", International Business Machines Corporation, Apr. 15, 2005, pp. 1-8. Printed from <http://www-128.ibm.com/developerworks/webservices/library/ws-wsrp/index.html> on May 1, 2007.

* cited by examiner

```
<UI ID="Wizard-Page-1" OPERATION="Display">
   <TEXT>Enter Your Name</TEXT>
   <INPUT Length="32"/>
</UI>
```
110
120
130

```
<I3270 ScreenID="Wizard">
   <FIELD Type="Numeric" Length="5"/>
   <FIELD Type="Alphabetic" Length="30">Enter Your Name</FIELD>
</I3270>
```
210
220
230

```
<UI ID="Wizard-Page-1" OPERATION="Refresh"/>
```

FIG. 14

```
1400
1410 — <UI ID="UI-ID">
1420 — ┌ <LABEL ID="id-LABEL-1">
       │   <VALUE>Last Name</VALUE>
       └ </LABEL>
1430 — <INPUT ID="id-INPUT-1" maxlength="length" />
1440 — ┌ <RADIO ID="id-RADIO-1">
       │   <VALUE>Pennsylvania</VALUE>
       │   <VALUE>Ohio</VALUE>
       │   <VALUE>North Carolina</VALUE>
       └ </RADIO>
1450 — <CHECKBOX ID="id-CHECKBOX-1"><VALUE>TRUE</VALUE></CHECKBOX>
1460 — ┌ <COMBO ID="id-COMBO-1">
       │   <VALUE>Pennsylvania</VALUE>
       │   <VALUE>Ohio</VALUE>
       │   <VALUE>North Carolina</VALUE>
       └ </COMBO>
1470 — <BUTTON ID="id-BUTTON-1"><VALUE>Submit</VALUE></BUTTON>
1480 — <BUTTON ID="id-BUTTON-2"><VALUE>Cancel</VALUE></BUTTON>
1490 — </UI>
```

RUNNING CONTENT EMITTERS NATIVELY ON LOCAL OPERATING SYSTEM

BACKGROUND OF THE INVENTION

Related Application

The present invention is related to commonly-assigned U.S. patent application Ser. No. 11/034,521, titled "Rendering Content Natively on Local Operating System", which was filed concurrently herewith.

1. Field of the Invention

The present invention relates to computer programming, and deals more particularly with client-side content collection and rendering.

2. Description of the Related Art

In recent years, a content aggregation framework based on a portal server model has become the defacto standard for development of web applications worldwide. In this approach, portal applications called "portlets" are used with the portal server.

Portlets are applications that emit markup into an aggregation stream, and have become a popular programming model. In the predominant approach, portlets are run on a portal server. A portal server may aggregate content from a number of these content-emitting applications when creating the aggregation stream. This aggregation stream represents a complete portal page, and this portal page is returned from the portal server to a client for display in the client's web browser. This portal/portlet model is well known in the art.

In an alternative approach, the portal model becomes even more ubiquitous by allowing a portal to run locally on a client machine and transferring portlets to the client for execution on the local machine. The locally-executing portal continues to aggregate content from each portlet, and sends the resulting aggregated stream to the client's web browser for rendering.

While this alternative local-execution approach is functionally workable in most cases, it has some limitations. These include:

1. The local browser, which is the expected renderer of the aggregated stream, is still required. If the browser software is changed or updated, the portal page may cease to function properly.

2. The browser-based approach acts as a barrier to the local operating system, such that the locally-executing portlets typically will only support local operating system functions to the extent the browser will allow. For example, a locally-executing portlet in this alternative approach cannot leverage dynamic data exchange ("DDE"), a messaging mechanism in the Windows® operating system, for the transfer of specific data between applications. ("Windows" is a registered trademark of Microsoft Corporation in the United States, other countries, or both.)

3. Each time the portal delivers a page to the browser, the browser will re-create the portal screen. This may cause excessive resource consumption and computing overhead, and may result in a screen-flashing scenario that is disruptive to the end user.

4. The portlets will not inherit the windowing characteristics of the underlying operating system.

Accordingly, it is desirable to provide a local portal experience that avoids these drawbacks.

SUMMARY OF THE INVENTION

The present invention provides local content collection techniques whereby a local (i.e., client-side) executive runs as a native application on the target operating system. In preferred embodiments, a portal/portlet model is used and a client-side portlet invokes, by its normal inclusion mechanism, a markup emitter such as a JavaServer Page ("JSP"™) that emits markup directed toward the native user interface environment. ("JSP" is a trademark of Sun Microsystems, Inc.) The portlet may be loaded on the client in various ways, including from a remote portal server, from the local file system or other local media, etc. (A portlet with a content emitter directed to a native environment may continue to run remotely as well.)

In alternative embodiments, portlets may continue to execute remotely, under control of a remote portal server. Or, content may be generated remotely using other types of content generators, such as a remote Web service (or other type of network-accessible service). In these alternative embodiments, a client-side executive is preferably responsible for requesting and receiving the remotely-generated content, and for directing that content to an appropriate window for native rendering on the client.

The present invention will now be described with reference to the following drawings, in which like reference numbers denote the same element throughout.

BRIEF DESCRIPTION OF THE DRAWINGS

FIGS. 1-3 illustrate sample markup language fragments, and are used when describing embodiments of the present invention;

FIG. 14 provides a sample markup language document illustrating several tags that may be processed by an embodiment of the present invention;

DESCRIPTION OF PREFERRED EMBODIMENTS

Figure 4:
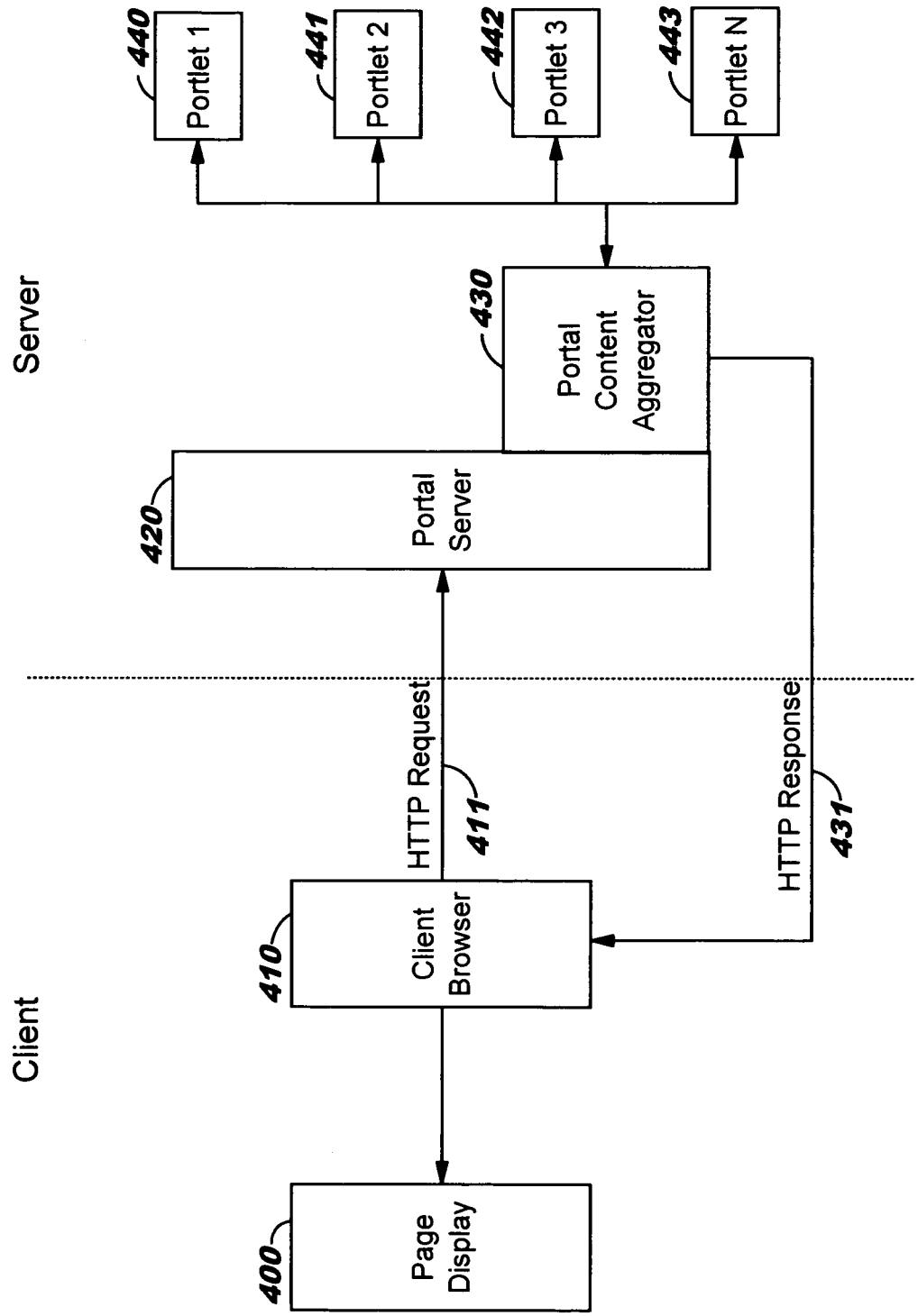
FIGS. 4 and 5 illustrate components and flows in a prior art portal server environment.

The present invention provides techniques for executing a local portal executive as a native application on the target operating system. The code used to implement the portal executive is not limited to a particular programming language, and in preferred embodiments, is capable of accessing operating system windowing messages, events, user input, and so forth. The executive preferably implements a standard portlet application programming interface ("API") and runtime environment. This will allow the executive to load standard portlets locally (for example, from the local file system) or retrieve them from a remote location (such as a remote portal server). The executive hosts the portlets and calls the portlets through the portlet API. Preferred embodiments are described herein with reference to the portlet API provided by the IBM WebSphere® Portal product, although this is by way of illustration and not of limitation. ("WebSphere" is a registered trademark of International Business Machines Corporation in the United States, other countries, or both.)

When a portlet is called and asked to render its content, it returns a markup stream. Existing portlets typically emit content in the Hypertext Markup Language ("HTML"), Compact HTML ("CHTML"), or Wireless Markup Language ("WML"). The content is then aggregated by a portal. It is expected that some portals will be supporting content in Extensible HTML ("XHTML") soon. Generally, a portal aggregator can be enhanced to support any appropriate language.

The local portal executive disclosed herein may support one or more of these markup languages and/or other languages (including languages yet to be developed). According to preferred embodiments, portlets are requested to render their output in a language or notation that maps the user interface for the portlet to standard controls (rather than using a browser-oriented markup language, as in the prior art). This notation is preferably based on the Extensible Markup Language ("XML") and is referred to herein as "User Interface Markup Language" or "UIML". Content emitted in this notation by a particular portlet may be device- and machine-independent, while other portlets may emit content that tends to be domain-specific. (References herein to UIML are not intended to limit the invention to use with a particular markup language, and various UI-oriented markup languages, such as the Extensible Application Markup Language, "XAML", may be used with embodiments of the present invention without deviating from the scope of the present invention.)

FIGS. 1 and 2 illustrate sample markup language fragments, using a sample markup language notation that may be supported by embodiments of the present invention, as will now be described. (The syntax in these example fragments is provided by way of illustration only.)

As depicted in fragment 100 of FIG. 1, the tag name for this sample element is "UI", and an "ID" (identifier) and "OPERATION" attribute are present on tag 110 in the example. Sample fragment 100 also includes two child elements "TEXT" 120 and "INPUT" 130. This example fragment may be rendered on the user interface as a wizard page, and illustrates a device- and machine-independent syntax.

The sample fragment 200 in FIG. 2 depicts a domain-specific syntax example, and is designed to illustrate rendering of content for a device in a 3270-type data stream approach. As depicted in this sample fragment 200, the tag name for this sample element is "I3270", and a "ScreenID" attribute is present on tag 210. Sample fragment 200 also includes two "FIELD"child elements 220, 230 which provide data for rendering on the user interface.

According to preferred embodiments, the markup streams created by locally-executing portlets are collected, but instead of being combined into a browser-based markup stream as in the prior art, windows represented by the markup streams are created for rendering in the native operating system. As will be discussed in more detail below, an association is maintained between the created window and the portlet(s) emitting content for that window. By maintaining this association between window and portlet, an optimization is realized. Referring again to FIG. 1, note that the sample markup fragment 100 uses the value "Wizard-Page-1" for its ID attribute on element 110. A locally-executing portlet can emit the content 300 shown in FIG. 3, where a "UI" element has this same "Wizard-Page-1" value for its ID attribute and now specifies a value of "Refresh" for its OPERATION attribute, thereby signalling that the previously-created window having the identifier "Wizard-Page-1" should now be refreshed. In contrast to prior art portal environments, where the portal screen is re-created in the browser for every display by the portal, this approach enables selective and explicit control over when a window will be redisplayed. By refreshing an existing window, rather than building a new window, embodiments of the present invention may provide better performance over prior art approaches.

Window refreshes may be triggered by various events or actions for which the portlet's logic is adapted. For example, user input (such as activating a "Clear" button on a user interface) may be defined as triggering a window refresh in some portlets. In another example, timers may be used to trigger window refreshes at predetermined intervals. Optionally, window content may be cached, and the cached content may be used when refreshing windows if the cached content continues to be valid. Embodiments of the present invention may also allow refreshes of a portion or subset of a window's content.

The markup depicted in FIGS. 1-3 can be produced with standard JavaServer Pages™ technology. According to preferred embodiments, an additional JSP is provided for each portlet that will execute natively, where this additional JSP is adapted for producing content for native execution. See the discussion of FIG. 5, where support for multiple JSPs by a portlet is described in more detail. ("JavaServer Pages" is a trademark of Sun Microsystems, Inc.) To the portlet writer, it is just another markup choice that the portlet provides for its emitted content, and all other logic in the portlet may remain the same.

It should be noted that while discussions herein refer primarily to JSPs as content emitters, this is by way of illustration and not of limitation. Alternatives include style sheets such as those created using the Extensible Stylesheet Language ("XSL"), combinations of JSPs with XML markup and XSL style sheets, inclusion of static files, and so forth.

The portal executive of preferred embodiments also maps input semantics, clipboard semantics, and DDE semantics from the operating system into messages delivered to the portlet through standard portlet API messages (as described in more detail below). This enables the portlet to accept data from, and provide data to, the user and the clipboard as well as other native applications.

The portal executive may choose to render all portlet windows into a single frame window (using, for example, the multiple document interface, or "MDI", approach, where multiple documents are rendered in separate child windows of a parent), or it may allow each portlet to render its content in a separate window. (Rendering multiple child windows within a single parent window is also referred to herein as a "multipane window system". This approach is not limited to an MDI interface, and embodiments of the present invention may support any window style that is deemed desirable without deviating from the inventive concepts disclosed herein.) Optionally, embodiments of the present invention may also allow rendering multiple portlet views in a separate child window of a parent window, or as separate and independent windows. In addition, user interface markup emitted by a locally-executing portlet could allow invocation of special controls that are provided by the operating system (such as tree controls, ActiveX® controls of the Windows operating system, and so forth; "ActiveX" is a registered trademark of Microsoft Corporation in the United States, other countries, or both). This is in contrast to portlets of the prior art, which render their content targeted to a browser environment and do not generate content directed toward operating system features.

While embodiments of the present invention allow portlets to execute as native applications, these portlets can continue to execute in a remote environment (and on other machines) and their content can continue to be served from a central portal server by using the portlet's browser-based JSPs. With this enhanced flexibility, the portlet application model may become even more ubiquitous across a variety of computing platforms.

Figure 5:
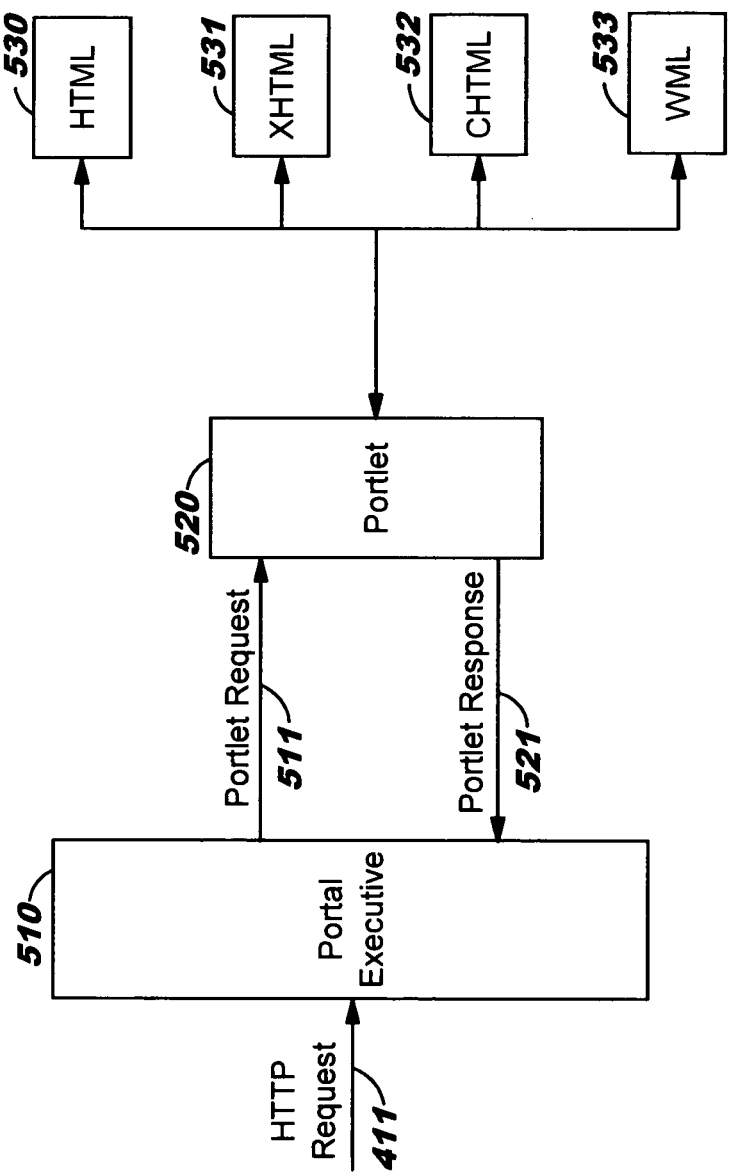

Turning now to FIGS. 4-5, an illustration is provided of components and flows in a prior art portal server environment. As shown in FIG. 4, a client browser 410 establishes a connection with a portal server 420, typically via a series of Hypertext Transfer Protocol ("HTTP") requests and responses. (Connections may be made using other protocols, such as Wireless Application Protocol ("WAP"). However, for ease of reference, discussions herein are in terms of using HTTP.) For each HTTP request 411 sent to the portal server 420, a markup page is returned to the browser 400 on an HTTP response 431. The client browser decodes the returned markup syntax and displays the page 400 to the user.

When the user has accessed the portal 420 and logged in (if a log-in is required), the portal creates the delivered markup page 400 as a markup stream that represents an aggregation of content from one or more server-side portlets 440-443. The portal content aggregator 430 calls appropriate one(s) of these portlets and each portlet returns a content fragment, as a stream of markup, to the aggregator; the aggregator then assembles the fragments into a composite stream for the markup page. When the page has been built in this manner, the content stream is returned to the client browser 410 via the HTTP response 431. (As noted above, the browser then decodes this content stream and displays the portal page for the user.)

To summarize, in this prior art environment, the server-side portlets run remotely, and when called by the portal content aggregator, render their content as a stream of markup to be aggregated for rendering in a client-side browser.

Reference is now made to FIG. 5. When the portal executive 510 function (see also 420, 430 of FIG. 4) receives a rendering request from a client via an HTTP request 411, the portal executive in turn creates a portlet request for each portlet for which content will be displayed on the portal page. By way of illustration, issuance of a portlet request to a single portlet 520 is shown in FIG. 5 at 511. In order to allow portals and portlets to support multiple output markup languages and multiple target devices, the portlet request typically contains a field (referred to herein as a content type field) that denotes the markup type for the portlet to render. For standard client browsers, this field is typically set to indicate HTML output. For newer mobile devices, this field is typically set to indicate XHTML output, while for older mobile devices it might indicate that WML or CHTML output is requested.

Upon receiving a portlet request 511, the portlet 520 checks the content type field, and through an inclusion mechanism, selects the proper JSP to call to render the markup-specific content stream. Each JSP 530-533 associated with a portlet 520 renders one unique markup syntax for a given set of content. For example, if the content type field in portlet request 511 is set to "HTML", the portlet 520 includes the JSP 530 that produces its output using HTML syntax, whereas if the type field is set to "WML", the portlet uses JSP 533 instead.

The JSP renders its content into a stream provided by the portlet 520 to the portal executive 510 as a portlet response 521. When all applicable portlets have been called and each portlet stream is returned to the portal aggregator, as shown at reference numbers 440-443 and 430 of FIG. 4, the portal aggregator assembles the composite stream and returns it 431 to the client browser 410.

Figure 6:
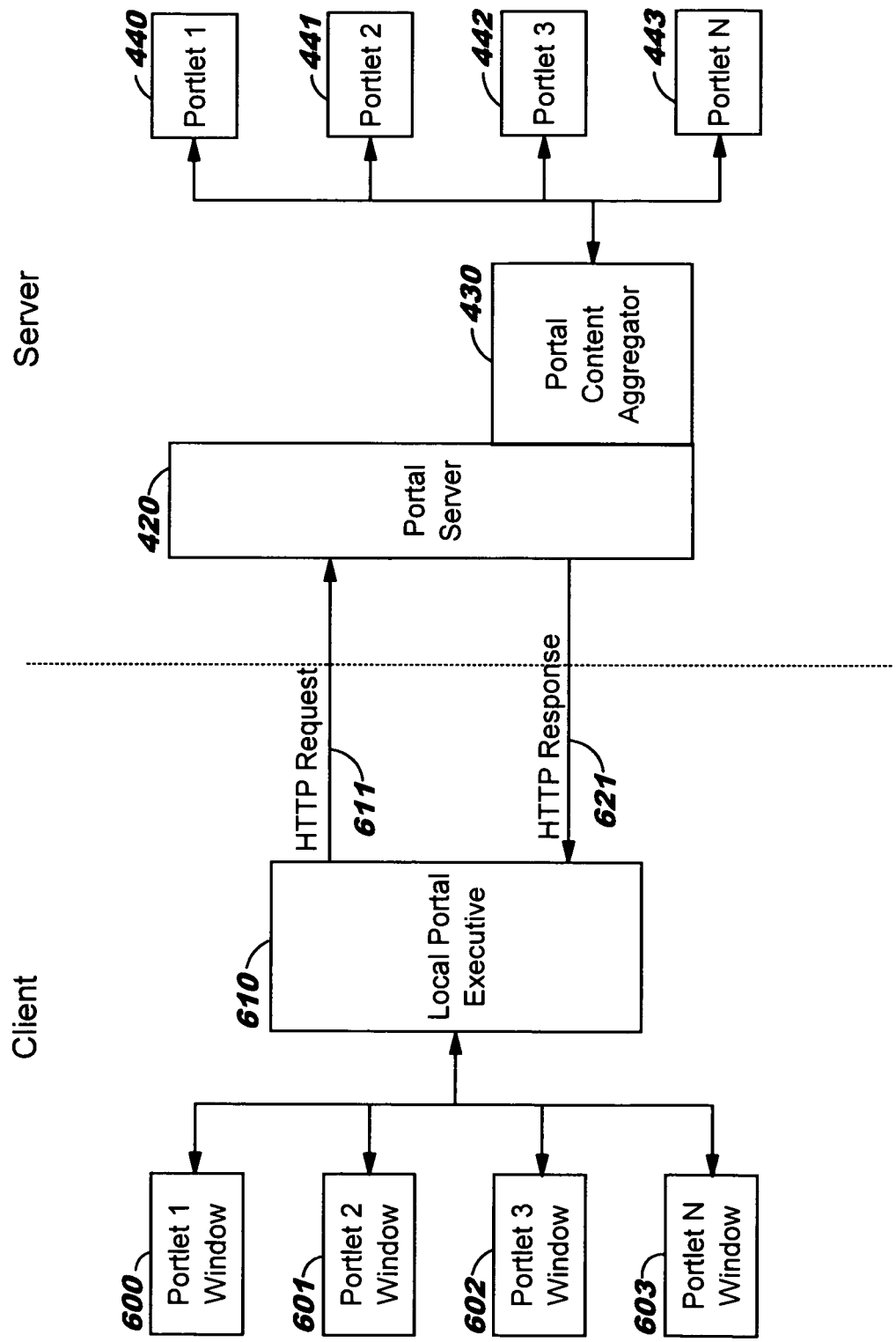
FIGS. 6 and 7 illustrate components and flows in an environment in which a local portal executive operates on a client, according to preferred embodiments.

Turning now to FIG. 6, an environment in which a local portal executive operates on a client is depicted, and is illustrative of embodiments of the present invention. Here, the locally-executing portal executive 610 sends an HTTP request 611 to the portal server 420, asking the portal server to transfer a portlet to the client for local execution. For example, any of "Portlet 1" 440 through "Portlet N" 443 might be requested. In preferred embodiments, the server-side portal 420 responds 621 by returning an archive, such as a Java™ Archive ("JAR"), file that comprises the execution artifacts of the requested portlet. ("Java" is a trademark of Sun Microsystems, Inc.)

Figure 7:
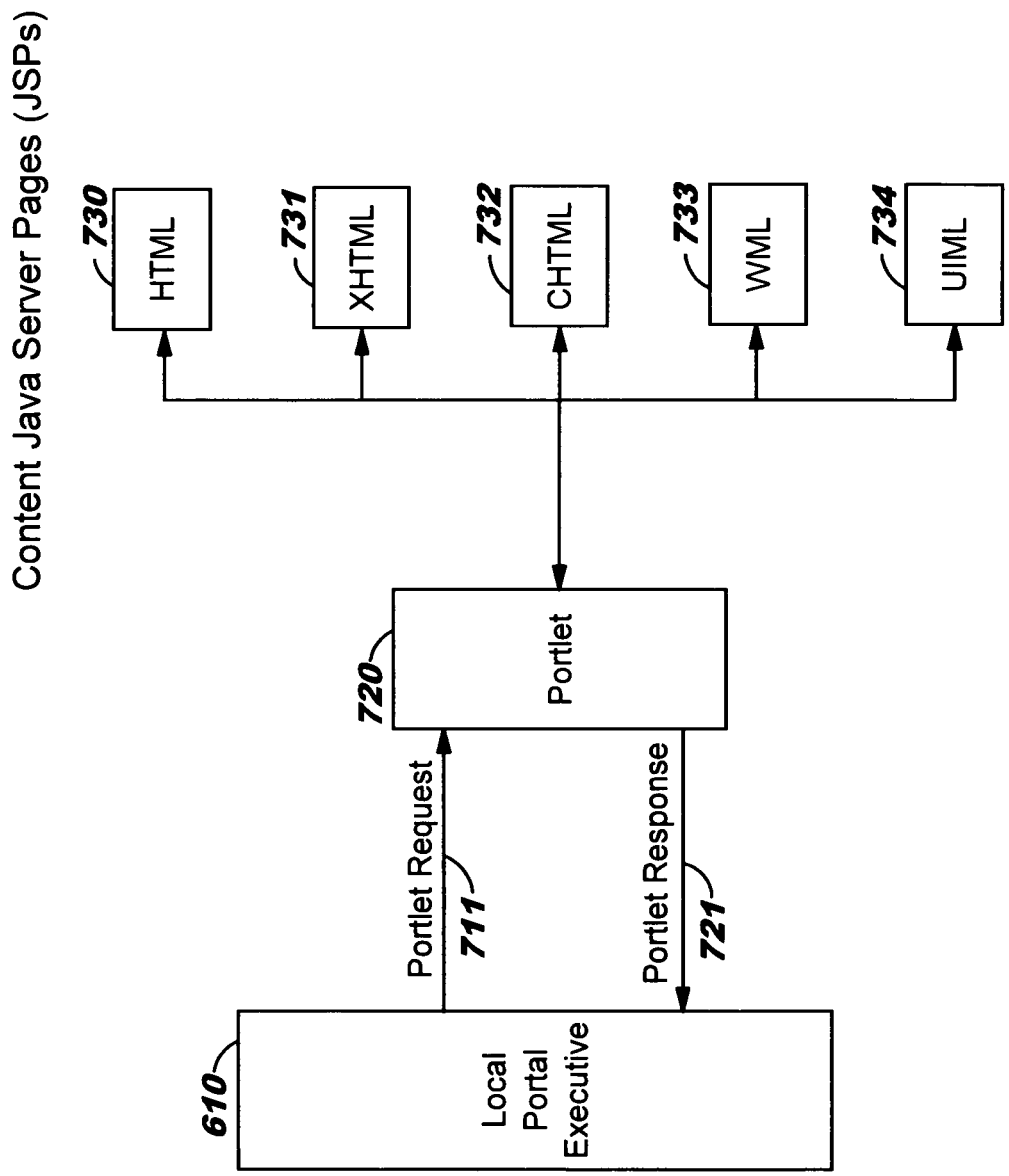

The local portal executive 610 then installs the portlet JAR file locally and begins execution of the portlet. As depicted in FIG. 7, according to preferred embodiments, the portlet is executed locally in the same way it is executed on the server side—that is, the portlet 720 is called via a portlet request 711, and the portlet in turn selectively includes a JSP for execution, based on the selected content markup as indicated by the content type field of the portlet request. As noted earlier, locally-executing portlets are preferably requested to render their output in a user interface notation referred to herein (by way of illustration) as UIML, and thus the portlet request preferably specifies a value such as "UIML" for the markup to be rendered. Note that portlet 720 is depicted as supporting inclusion of JSPs 730-733 that render several different markup languages (as in FIG. 4) and now also supports a JSP 734 that renders content in UIML. The content emitted by portlet 720 may then be rendered into a window on the client, as shown generally at 600-603 of FIG. 6.

It should be noted that a portlet that supports UIML-type content will be able to run locally on the client, under control of the local portal executive, and such portlets will also continue to be able to run on a server-side portal server. (When running on the server side, the UIML-emitting JSP will not be called to render content responsive to a server-side portal rendering request because the server-side executive will not request that output type.)

Figure 8:
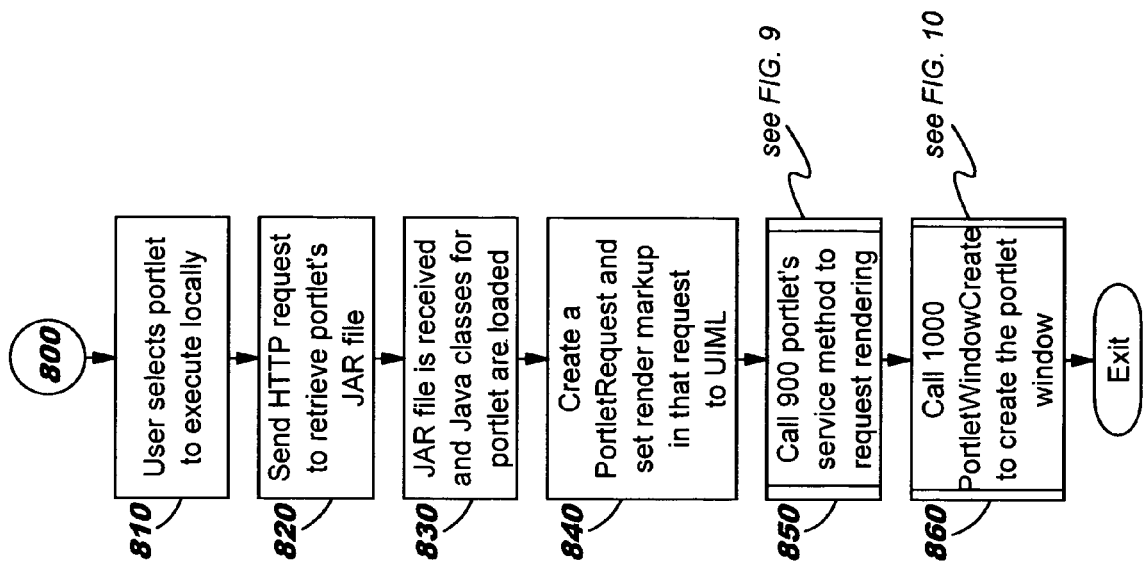
FIGS. 8-13 provide flowcharts depicting logic that may be used when a portlet executes on a client, according to preferred embodiments.

FIGS. 8-13 provide flowcharts depicting logic that may be used when a portlet executes on a client, according to preferred embodiments, as will now be described in more detail. FIG. 8 depicts, at a high level, the process of retrieving a portlet's execution JAR file from the portal server and loading the portlet's classes to begin execution. This process also creates a window for rendering the portlet's content and values (i.e., initializes) the portlet window and controls with initial values.

The processing of FIG. 8 begins when a user selects a portlet (Block 810), and that portlet will be executed locally. In Block 820, an HTTP request is sent by the local portal executive to retrieve the portlet's JAR file. (It should be noted that the present invention is not limited to retrieval of portlets from a server. As one skilled in the art will understand, the portlets could alternatively be installed in other ways, for example by manually retrieving the JAR file from the Internet or by loading it from local media such as a disk drive of the local file system or a CD-ROM.)

The JAR file is received (Block 830) and the Java classes for the portlet are loaded. A portlet request is created (e.g., as a PortletRequest invocation, Block 840) and its content type field is set to request UIML markup. A call is then made to the portlet's service method (Block 850) to request content rendering. (See FIG. 9, where this processing is depicted in more detail.) After the portlet returns its content, a method is called at Block 860 to create the portlet's window. (See FIG. 10, where this is depicted in more detail.) The processing of FIG. 8 then exits.

Figure 9:
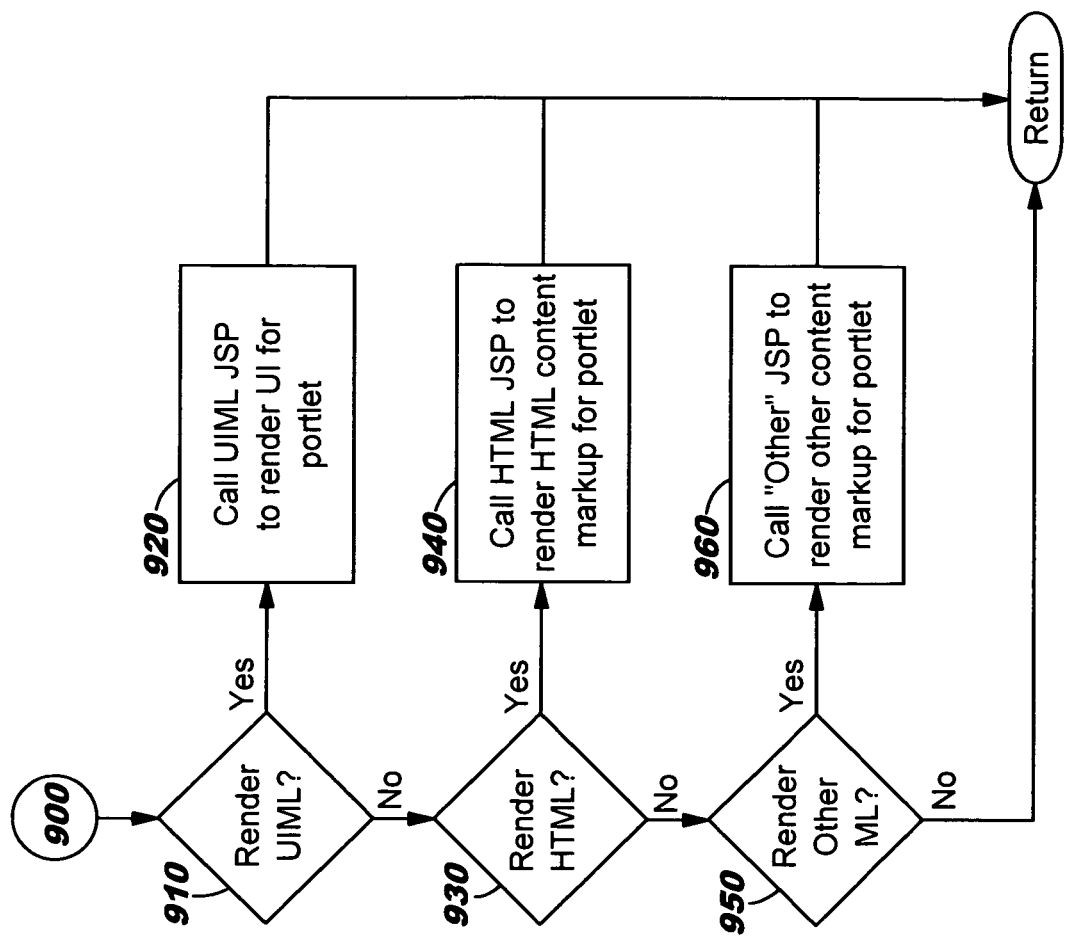

FIG. 9 depicts the process within a portlet for selecting the rendering from a particular JSP, based on the content type field in the PortletRequest, and corresponds generally to the portlet's "service" method. Block 910 tests to see if the content type is set to UIML. If so, then the UIML-emitting JSP is called (Block 920) to render user interface ("UI") content. Otherwise, Block 930 tests to see if the content type is set to request HTML rendering. If this test has a positive result, then Block 940 calls the HTML-emitting JSP for this portlet to render HTML markup. If control reaches Block 950, tests may be made for other available content-emitting JSP notations, and the applicable JSP may then be called (Block 960). Processing of FIG. 9 then exits. (As noted earlier, the portlet's business logic does not need to change when the portlet executes natively, and thus this application-specific processing is not shown in FIG. 9.)

Figure 10:
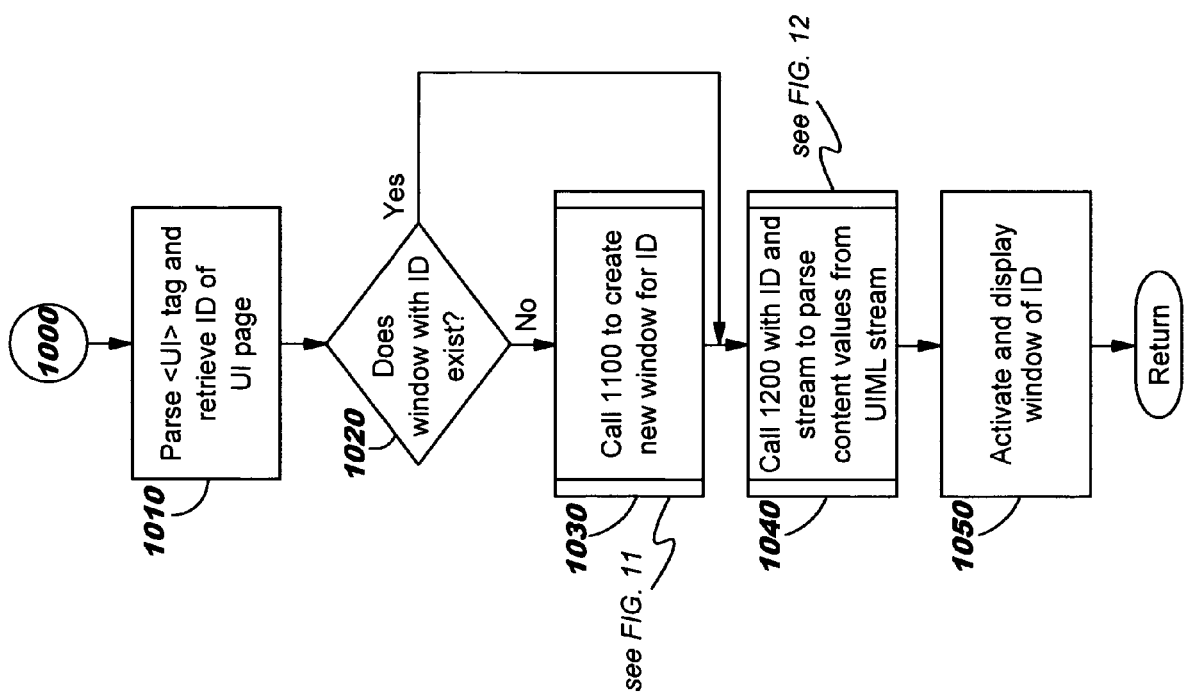

FIG. 10 shows a high-level flow of logic which may be used for creation of the main window for a portlet as well as the subsequent calls to have child controls in the main window valued with their applicable values. (FIGS. 11-13 provide more details of this processing.)

Input to the processing of FIG. 10 is a UIML content stream created by a portlet. In Block 1010, the tag value of the opening element of the portlet's emitted content (which, for purposes of illustration, is referred to herein as a "UI" tag) is parsed, and the value of this tag's ID attribute is retrieved. This ID attribute is used to find the window into which the portlet's content stream should be rendered. In Block 1020, a test is made to see if this ID attribute value matches the ID attribute associated with an earlier-created window. If so, control transfers to Block 1040 for processing of that existing window. Otherwise, a method is called at Block 1030 to create a new window (which will then be associated with this ID attribute value), and processing then continues at Block 1040. (Note that once a new window is created, it can communicate with the portlet executive, but can also operate independently and can be accessed by other applications. This is distinct from portal pages of the prior art.)

Figure 12:
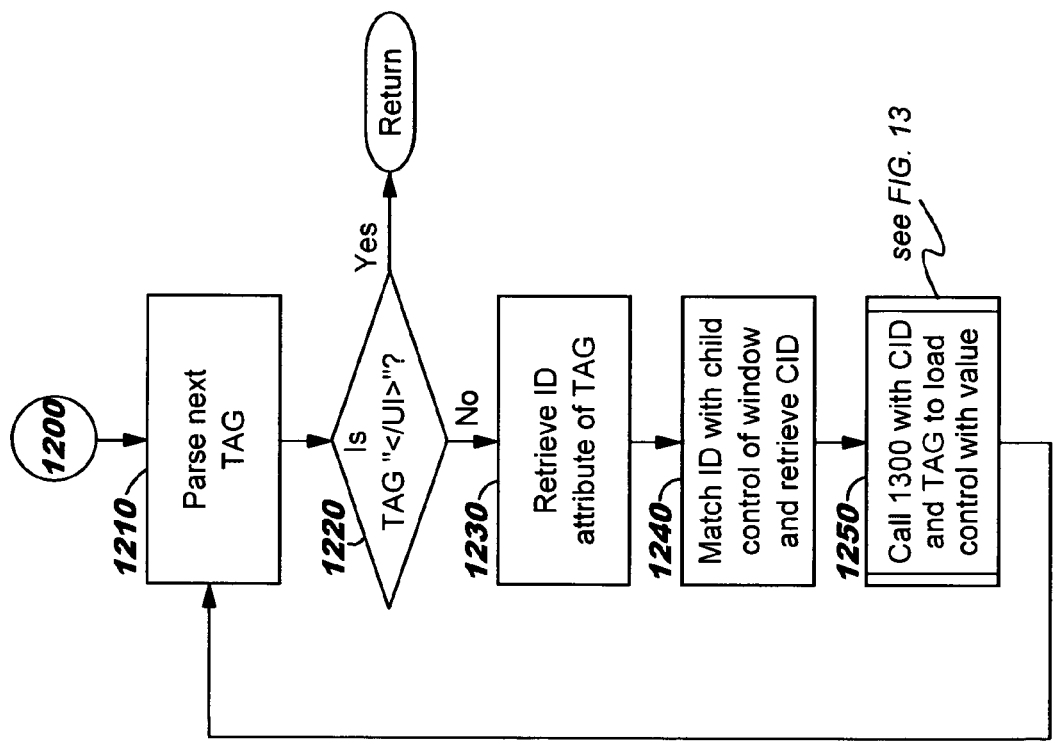
Figure 13:
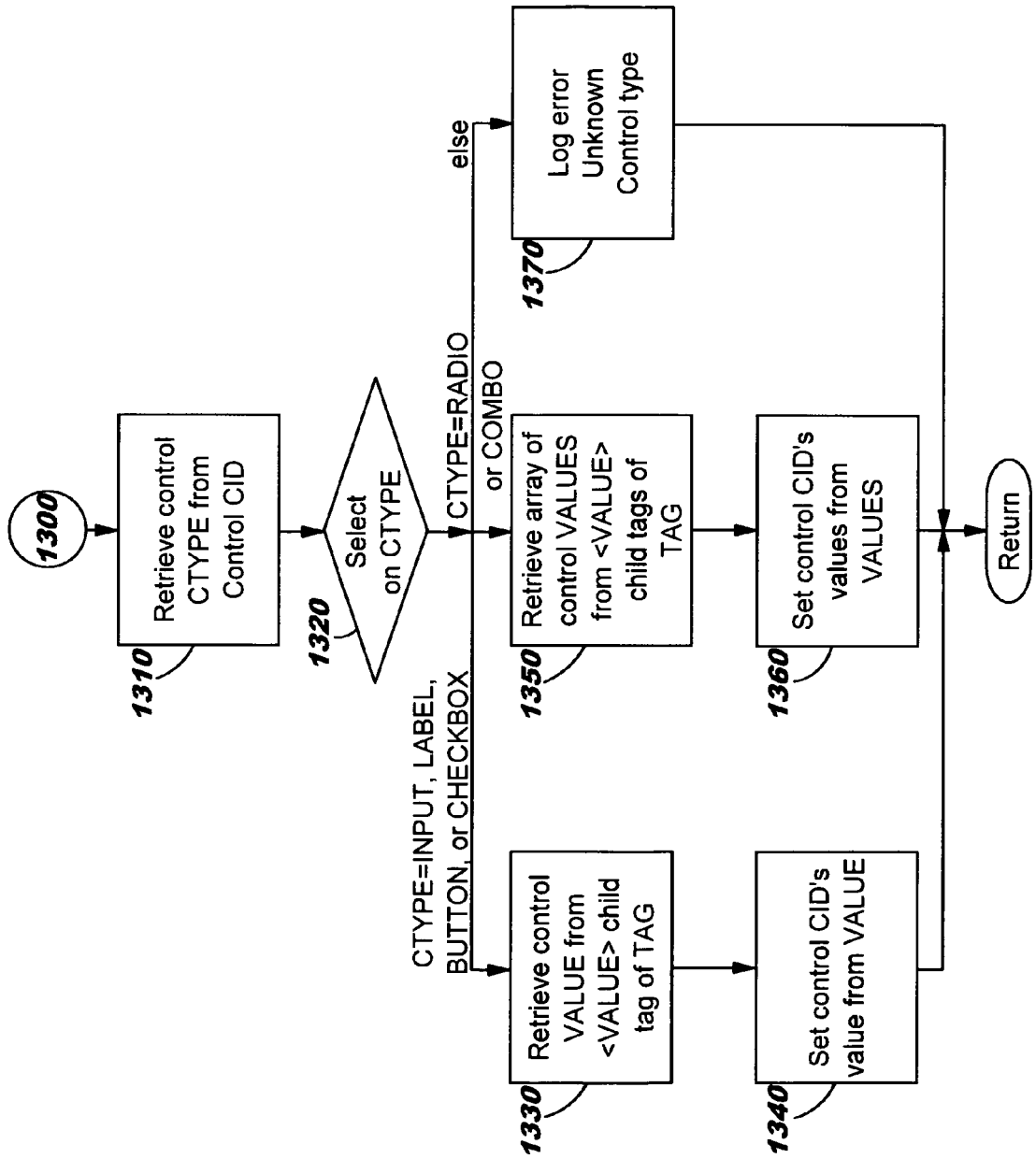

At Block 1040, a method is called, passing the ID attribute value and the stream emitted by the portlet, where this method will then parse the content values from the stream (as depicted in more detail in FIG. 12). Upon returning from the processing of FIG. 12, the window associated with the ID is activated and rendered (Block 1050). The processing of FIG. 10 then returns.

Figure 11:
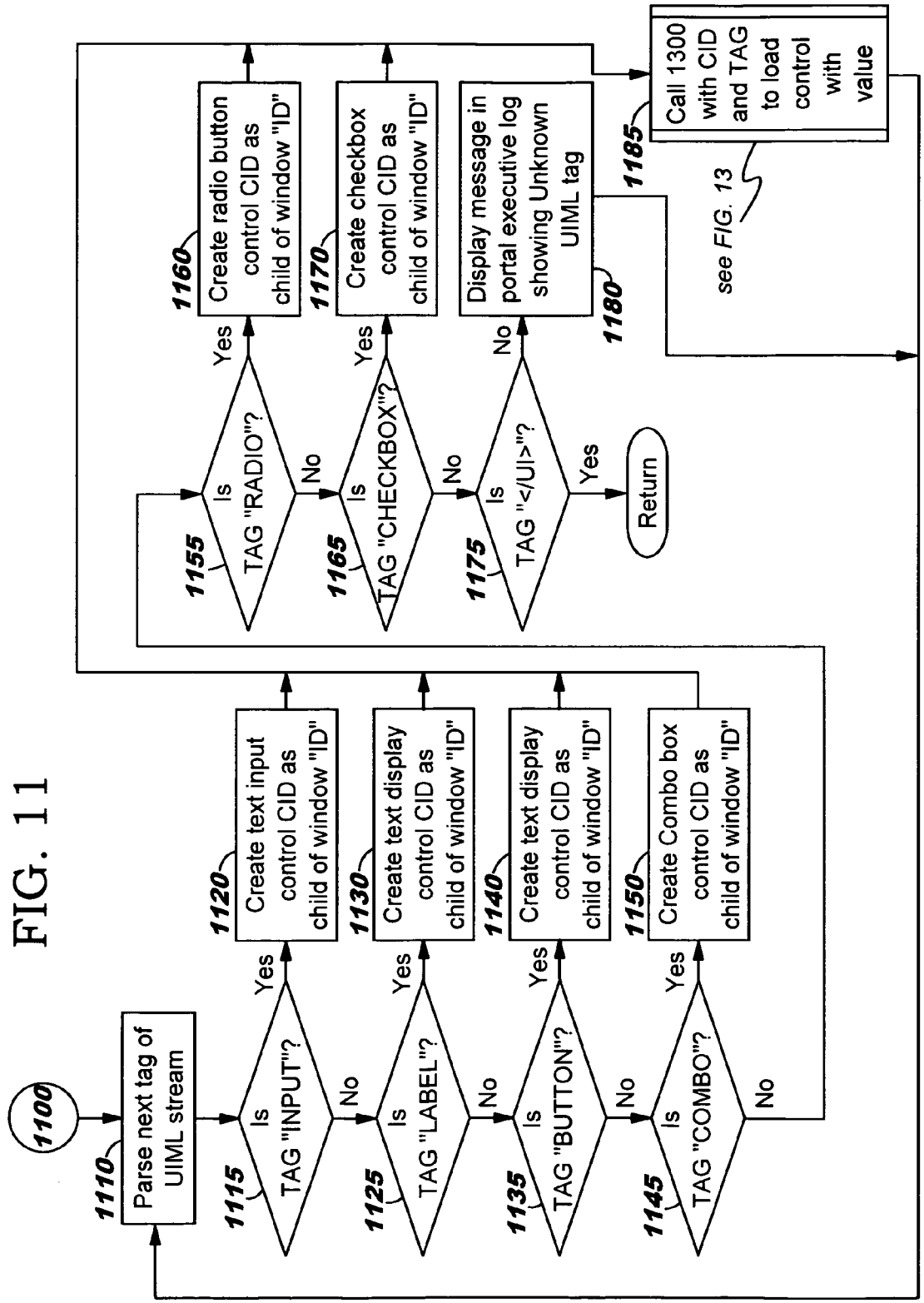

The flowchart in FIG. 11 depicts creation of the child controls of the newly-created window to be used for rendering a portlet's content. In preferred embodiments, each control is created by reading the UIML input stream provided from the UIML-emitting JSP, and creating a child control that matches the tag type in that stream, as will now be described in more detail.

Block 1110 parses the next tag of the passed UIML stream. Block 1115 tests to see if that tag has the value "INPUT". If so, then Block 1120 creates a text input control connection ID ("CID") as a child of the parent window (where this parent window is the window associated with the "ID" value passed as input). Similarly, Blocks 1125 and 1135 test the tag to see if it is a "LABEL" or "BUTTON" tag, respectively, and if so, Blocks 1130 and 1140 create a text display control as a child of the parent window. If the tag does not match any of these values, it is tested in Block 1145 to see if the value is "COMBO", and if so, Block 1150 creates a combo box control CID as a child of the parent window. Blocks 1155 and 1165 test the tag to see if it is "RADIO" or "CHECKBOX", respectively, and if so, Blocks 1160 and 1170 create a radio button control CID or checkbox control as a child of the parent window.

After any of the child control CIDs has been created, control reaches Block 1185, which calls a method to load the control with a value (passing the CID and current tag as input). This method is depicted in more detail in FIG. 13. Upon returning from the processing in FIG. 13, control then transfers to Block 1110 to continue parsing the UIML stream.

If the tag value does not match any of the previously-tested values, control reaches Block 1175, which tests to see if the closing tag syntax ("</UI>", in this example) for the UIML element has been reached. If so, then the input stream has been completely parsed and its child controls have been processed, so the processing of FIG. 11 returns. Otherwise, when the test in Block 1175 has a negative result, the current tag has an unexpected value. Block 1180 therefore preferably writes a message to a portal executive log file, where the message contains the value of this tag, after which processing continues at Block 1110 to continue parsing the UIML stream. (Alternatively, control may exit immediately from the processing of FIG. 11 when Block 1180 has processed an unexpected tag, which may indicate an error situation.)

FIG. 12 depicts logic which may be used to implement valuation of each user interface control of a UIML content stream by retrieving the control's "VALUE" tag or tags from the UIML input stream (whether for a newly-created window or a window whose values are being updated; see the discussion of Block 1020-1040 of FIG. 10), and using the textual values contained within the value tags to assign values to the controls within the window. Thus, at Block 1210, the next tag from the UIML input stream is parsed, and Block 1220 tests to see if this is the closing tag for the <UI> element. If so, then processing of FIG. 12 returns to the invoking logic. Otherwise, control reaches Block 1230, which retrieves the ID attribute value from the current tag. The control's ID is used to match the child control to the main window, and thus Block 1240 matches the retrieved ID attribute value with the child control of the window and then retrieves the associated CID. Block 1250 then invokes the processing of FIG. 13 to load the control with a value (passing the CID and current tag as input). Upon returning from the processing in FIG. 13, control then transfers to Block 1210 to parse the next tag in the UIML stream.

FIG. 13 (which is invoked from Block 1185 of FIG. 11 and Block 1250 of FIG. 12) shows the process of extracting "<VALUE>" tags from the children tags of a UIML control tag and using the values contained within the tags to value the corresponding control in the window. Block 1310 retrieves the control's CTYPE value from the control CID. A select operation is then performed, in preferred embodiments, on this CTYPE value. If the CTYPE value indicates that this control corresponds to an INPUT, LABEL, BUTTON, or CHECKBOX control, then Block 1330 retrieves the control's value from a "<VALUE>" tag which is a child of the current tag. Block 1340 then sets the control CID's value to this retrieved value, after which control then returns from FIG. 13.

If the CTYPE value tested in Block 1320 indicates that this control corresponds to a RADIO or COMBO control, then Block 1350 retrieves an array of control values from the <VALUE> tags which are child tags of the current tag. Block 1360 then sets the control CID's values from these retrieved values, and control then returns from FIG. 13.

If the test in Block 1320 determines that the CTYPE value is unexpected, Block 1370 preferably logs an "unknown control type" error message into the local portal executive's log file, and control then returns from FIG. 13.

FIG. 14 provides a sample markup language document illustrating several tags that may be processed by an embodiment of the present invention. As noted earlier, the UIML language discussed herein is by way of illustration only, and provides an example of a notation that is optimized for creation of windows and child controls. Embodiments of the present invention may generally use any user interface markup language, including existing markup languages such as HTML, as the output of the JSP that is invoked when a portlet is executed natively. (As will be obvious, the window creation and valuation logic will reflect the complexity of the language chosen, and thus the processing shown in the flowcharts is illustrative but not limiting.)

The sample document 1400 in FIG. 14 uses a "UI" element (see reference number 1410), as has been discussed, and this element has an ID attribute whose value is used to identify the window into which this content will be rendered. The UI element may contain various child elements, and several are illustrated in FIG. 14. In preferred embodiments, each child element has an ID attribute, and this attribute is used to identify the control associated with the child element. (The uniqueness requirements among values of the ID attributes for controls within a window depend on the underlying operating system. As a general rule, if all controls within a given window have a unique ID, uniqueness requirements should be met for all operating systems. Optionally, unique ID attribute values may be generated automatically, using techniques which are outside the scope of the present invention, for those controls that do not have explicit IDs provided by the content-emitting software. While use of ID attributes is preferred, these attributes may alternatively be omitted from child elements without deviating from the scope of the present invention.)

As an example of a child element within a UI element for a window, a LABEL element 1420 includes an ID attribute and a VALUE child element. The LABEL element 1420 may be created by the content-emitting JSP to specify text that should be placed in the window being created or refreshed. An INPUT element 1430 includes an ID attribute and a "maxlength" attribute, and may be created by the content-emitting JSP to specify that user input should be provided in the window. A RADIO element 1440 includes an ID attribute and some number of child VALUE elements. In this example, 3 child VALUE elements are specified, thus indicating that a set of 3 radio buttons should be rendered in the window; the text associated with each button is to be taken from the text specified in the child VALUE elements. A CHECKBOX element 1450 includes an ID attribute and a VALUE child element. This element may be created by the content-emitting JSP to specify that the window should include a checkbox control, where the text specified in the VALUE child element is to be rendered with that control. A COMBO element 1460 includes an ID attribute and some number of child VALUE elements. In this example, 3 child VALUE elements are specified, thus indicating that a combo box control should be rendered in the window, using the text taken from these 3 child VALUE elements. Elements 1470 and 1480 illustrate two examples of BUTTON elements, each having an ID attribute. The content-emitting JSP may create this syntax to specify graphical buttons to be rendered on the window. Reference number 1490 refers to the closing tag for the UI element 1410.

Figure 15:
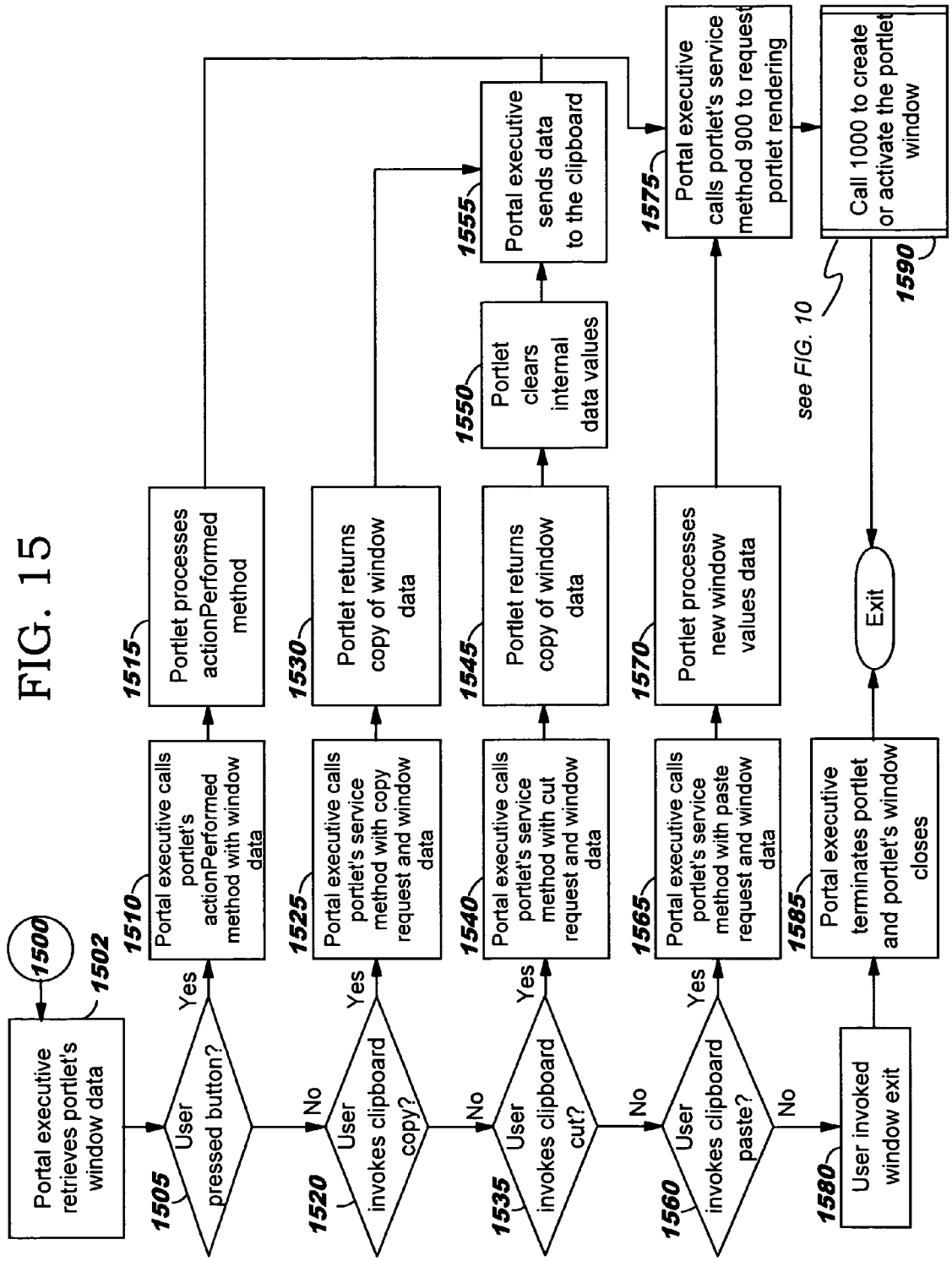
FIG. 15 provides a flowchart depicting logic that may be used to process user interactions with a locally-executing portlet, according to preferred embodiments.

FIG. 15 illustrates the local portal executive processing user events. A user may interact with a window in a number of ways, including: pressing a button on the UI; requesting a clipboard copy, cut, or paste operation; and requesting a window exit. In preferred embodiments, these user events are handled in the same way a non-portlet application handles them. Recall that traditional portlets, since they are rendered by a browser, cannot receive clipboard events. By contrast, the local portal executive of preferred embodiments can implement new events, not generated by a portal server, to support clipboard operations. (DDE is typically implemented using a clipboard metaphor. For example, drag and drop operations are typically implemented as a copy-and-paste clipboard operation. Thus, it will be obvious to one of skill in the art how DDE semantics may be supported using teachings provided herein.)

When the user interacts with the UI of a given portlet, the portal executive preferably retrieves a copy of the portlet's window data (Block 1502). If the user interaction comprises pressing a button on the UI (Block 1505), the portal executive of preferred embodiments creates an action event and passes the action event, along with the window data retrieved at Block 1502, to the portlet by calling the portlet's "actionPerformed" method (Block 1510). The portlet then acts on the action associated with the pressed button (Block 1515), as appropriate, and the portal executive then calls the portlet with a PortletRequest invocation to the portlet's service method (Block 1575), thereby requesting the portlet to invoke the UIML-emitting JSP and render content reflecting its new state. Block 1590 then invokes the processing of FIG. 10 to create or activate the portlet window. The processing of FIG. 15 then exits.

If the user invokes a clipboard copy operation (Block 1520), the portal executive of preferred embodiments calls the portlet's service method (Block 1525) with a copy request (thus invoking a clipboard-related call on the portlet) and the window data retrieved at Block 1502, and responsive to this request, the portlet returns a copy of its window data (Block 1530). The portal executive then sends this data to the clipboard (Block 1555), after which it calls the portlet's service method (Block 1575) to request portlet rendering and invokes the processing of FIG. 10 (Block 1590) to create or activate the portlet window.

If the user invokes a clipboard cut operation (Block 1535), the portal executive of preferred embodiments calls the portlet's service method (Block 1540) with a cut request and the window data retrieved at Block 1502, and responsive to this request, the portlet returns a copy of its window data (Block 1545). The portlet then clears the internal data values (Block 1550) corresponding to the data being cut, and the portal executive then sends the data it received from the portlet at Block 1545 to the clipboard (Block 1555), after which it calls the portlet's service method (Block 1575) to request portlet rendering and invokes the processing of FIG. 10 (Block 1590) to create or activate the portlet window.

If the user invokes a clipboard paste operation (Block 1560), the portal executive of preferred embodiments calls the portlet's service method (Block 1565) with a paste request and the window data retrieved at Block 1502, and responsive to this request, the portlet processes the new window values (Block 1570)—that is, values currently on the clipboard are used to set corresponding state data of the portlet. The portal executive then calls the portlet's service method (Block 1575) to request portlet rendering and invokes the processing of FIG. 10 (Block 1590) to create or activate the portlet window.

When the user signals for the window to exit or close (Block 1580), the local portal executive of preferred embodiments terminates the running portlet instance, closes its window, and purges the portlet application from memory (Block 1585). Following completion of Block 1585, the processing of FIG. 15 exits.

Preferred embodiments have been described herein with reference to using a web portal/portlet model for content aggregation. It should be noted, however, that references herein to using portals or portlets are by way of illustration and not of limitation. Alternatively, techniques disclosed herein may be adapted for use with other content aggregation models.

As has been demonstrated, the present invention provides advantageous techniques that enable portlets to execute locally, as a native application, invoking markup emitters such as JSPs to instantiate native user interfaces. Using the disclosed techniques, the portlets can also continue to execute as markup producers running in a remote environment to create content directed toward a browser. Natively-executing portlets may leverage a number of operating system facilities that are unavailable to a browser-based environment, including data transfer through DDE, direct user input support and operating system input support, and windowing or clipboard operations (including cut, copy, and paste semantics).

Preferred embodiments have been described thus far with reference to a client-side portal executive and content emitters executing at the client, where these content emitters are loaded onto the client, by the client-side portal executive, for local execution. (As discussed with reference to FIG. 6, a server-side portal server may transmit the content emitters to the client, on request of the client-side portal executive, as archive files.) Alternative approaches based on the teachings disclosed herein may be implemented without deviating from the scope of the present invention. Several such alternatives will now be discussed with reference to FIGS. 16-18.

Figure 16:
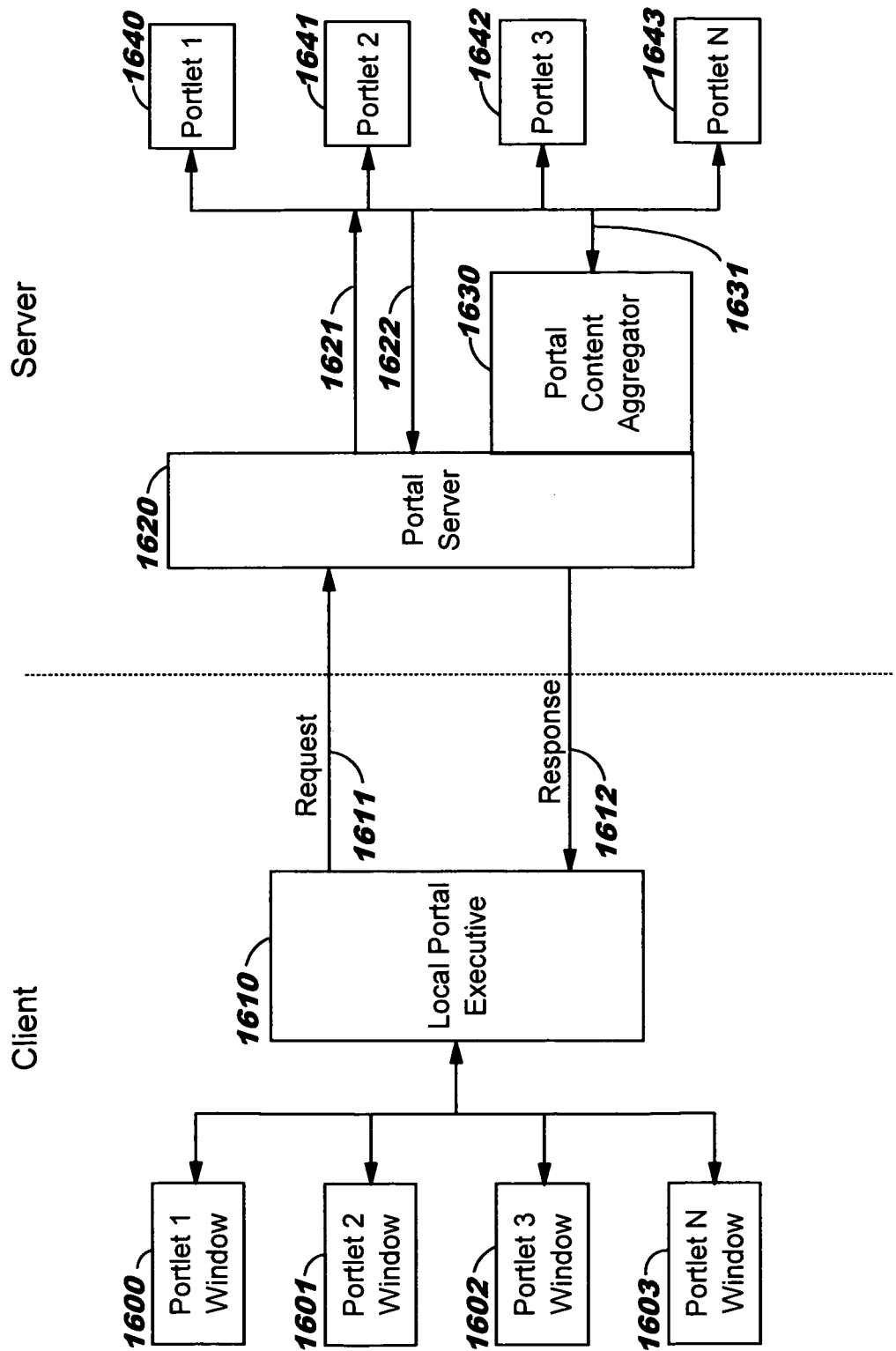
FIGS. 16 and 17 illustrate a first alternative embodiment where content is generated remotely and rendered natively.

In a first alternative, the content emitters may remain on the server side, and execute remotely at the server side, to create output for use with embodiments of the present invention. This alternative is illustrated in FIG. 16. As shown therein, a client-side portal executive 1610 in this embodiment communicates 1611, 1612 with a server-side portal server 1620. Requests 1611 in this embodiment generally comprise requests for content to be generated by a particular portlet "X", where that portlet is requested (for example, in a content type parameter) to generate its content in UIML or another UI markup language that is adapted for native client-side rendering.

When the local portal executive 1610 wishes to request content from a server-side portlet 1640-1643, it preferably sends a request 1611 to the server-side portal server 1620, identifying the target portlet and content type. The portal server 1620 preferably sends a portlet request 1621 to the target portlet. In one approach, the portlet returns its content to the portal server using an interface 1622. Alternatively, the existing content aggregator interface 1631 may be used for returning the portlet's generated content to content aggregator 1630. In either case, portal server 1620 then returns the UIML stream in response 1612 to the local portal executive 1610, and executive 1610 renders that stream in an appropriate portlet window 1600 -1603. (As has been discussed above, an ID attribute in the opening tag of the UIML stream is preferably used to determine the window into which the content should be rendered.)

Figure 17:
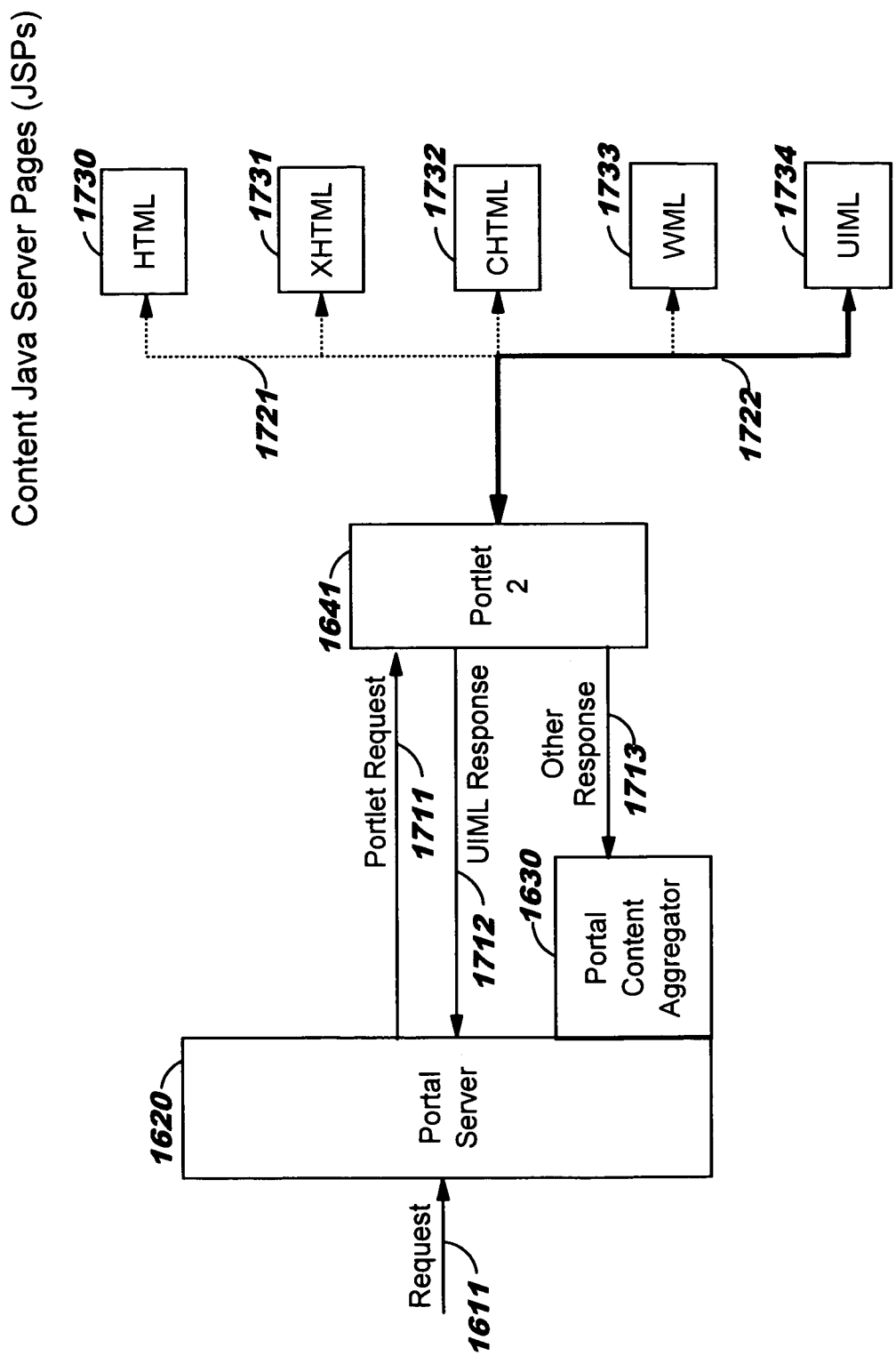

Expanding on this alternative in more detail, suppose the local portal executive 1610 requests content from portlet 2 1641, to be emitted using UIML markup. Request 1611 therefore identifies portlet 2 and the UIML content type. Components and flows that may be used in the server-side processing of this request are depicted in FIG. 17. As shown therein, upon receiving request 1611, portal server 1620 preferably sends a portlet request 1711 to invoke processing of portlet 2 1641, and portlet 2 then dynamically includes its UIML markup emitter 1734. (A dashed line is used at 1721 in FIG. 17 to illustrate the availability of markup emitters 1730-1733, and a solid line is used at 1722 to illustrate that, in this scenario, markup emitter 1734 is in use.) Markup emitted by portlet 2 1641 in the UIML markup language is preferably returned directly to the portal server 1610, as shown in the "UIML" portlet response 1712, whereas markup emitted using other JSPs 1730-1733 is preferably returned to the content aggregator 1630, as shown in the "other" portlet response 1713.

Figure 18:
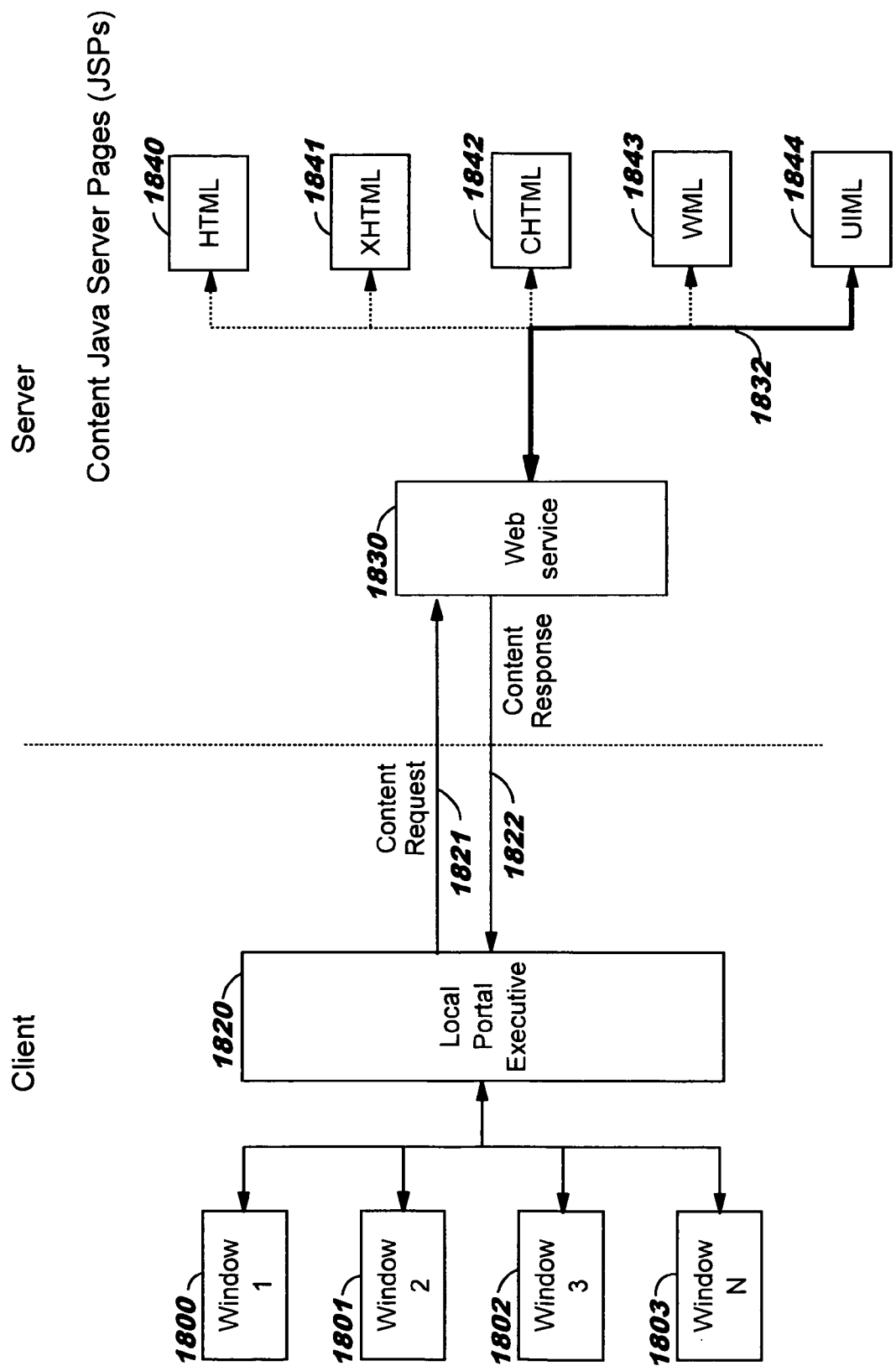
FIG. 18 illustrates a second alternative embodiment where content is generated by a remote Web service for native rendering.

In yet another alternative, a remote content emitter is not required to adhere to the portal/portlets model. Content adapted for native rendering in a windowing environment may be generated remotely by a Web service, for example, and delivered to a client-side executive for rendering. This alternative is illustrated in FIG. 18. As shown therein, a client-side portal executive 1820 in this embodiment is responsible for rendering content in various windows 1800-1803. The portal executive is shown at 1821, 1822 as communicating, by way of example, to request and receive content from a remote Web service 1830. In one approach, Web service 1830 may be adapted only for generating content in UIML. In another approach, Web service 1830 may be adapted for receiving a content type indicator on content requests, such that it can dynamically include a markup emitter 1840-1844, as has been discussed herein with reference to portlets. In this approach, content request 1821 identifies a UIML emitter 1844 (or another emitter of markup adapted for native rendering), which is then included 1832 in the Web service processing. Content response 1822 thus delivers UI markup to the local portal executive 1820 for rendering in an appropriate window.

As will be appreciated by one of skill in the art, embodiments of the present invention may be provided as methods, systems, or computer program products comprising computer-readable program code. Accordingly, the present invention may take the form of an entirely hardware embodiment, an entirely software embodiment, or an embodiment combining software and hardware aspects. The computer program products maybe embodied on one or more computer-usable storage media (including, but not limited to, disk storage, CD-ROM, optical storage, and so forth) having computer-readable program code embodied therein.

When implemented by computer-readable program code, the instructions contained therein may be provided to a processor of a general purpose computer, special purpose computer, embedded processor, or other programmable data processing apparatus to produce a machine, such that the instructions, which execute via the processor of the computer or other programmable data processing apparatus, create means for implementing embodiments of the present invention.

These computer-readable program code instructions may also be stored in a computer-readable memory that can direct a computer or other programmable data processing apparatus to function in a particular manner, such that the instructions stored in the computer-readable memory produce an article of manufacture including instruction means which implement embodiments of the present invention.

The computer-readable program code instructions may also be loaded onto a computer or other programmable data processing apparatus to cause a series of operational steps to be performed on the computer or other programmable apparatus to produce a computer-implemented method such that the instructions which execute on the computer or other programmable apparatus provide steps for implementing embodiments of the present invention.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of executing native content emitters, comprising:
   executing, on a client, an executive that issues requests to, and receives responses from, one or more content emitters that are executing on the client to emit content for native rendering, wherein at least one of the content emitters is also capable of executing remotely to emit content for delivery to the client in an aggregated stream.

2. The method according to claim 1, wherein the content emitters are portlets.

3. The method according to claim 1, wherein the content emitters emit content in a first format when executing on the client and in a second format when executing remotely.

4. The method according to claim 3, wherein the first format is adapted for the native rendering.

5. The method according to claim 3, wherein the second format is adapted for rendering with a client browser.

6. The method according to claim 1, further comprising rendering, at the client, the content emitted by at least one of the content emitters that are executing on the client.

7. The method according to claim 6, wherein the rendering further comprises mapping, by the executive, the emitted content to operating system capabilities on the client.

8. The method according to claim 6, wherein the rendering further comprises using, by the executive, windowing features of an operating system on the client for the rendering.

9. The method according to claim 6, wherein:
   a plurality of the content emitters are executing on the client to emit the content for native rendering;
   the rendering renders the content emitted by at least two of the plurality of content emitters that are executing on the client; and
   the rendering further comprises displaying the content emitted by each of the at least two content emitters in distinct frames of a window.

10. The method according to claim 6, wherein:
    a plurality of the content emitters are executing on the client to emit the content for native rendering;
    the rendering renders the content emitted by at least two of the plurality of content emitters that are executing on the client; and
    the rendering further comprises independently displaying the content emitted by each of the at least two content emitters in a separate window.

11. The method according to claim 6, further comprising refreshing the rendered content.

12. The method according to claim 1, wherein the executive notifies the content emitters whether to emit content for the native rendering or for delivery in the aggregated stream.

13. The method according to claim 1, further comprising requesting, by the executive, loading on the client of at least one of the content emitters from a local storage medium.

14. The method according to claim 1, further comprising requesting, by the executive, loading on the client of at least one of the content emitters from a remote repository.

15. The method according to claim 1, wherein:
    a plurality of the content emitters are executing on the client to emit the content for native rendering; and
    the executive operates as a client-side portal for collecting content received from each of the plurality of content emitters for rendering, using a native operating system of the client, into separate child windows of a parent frame.

16. The method according to claim 1, wherein:
    a plurality of the content emitters are executing on the client to emit the content for native rendering; and
    the executive operates as a client-side portal for collecting content received from each of the plurality of content emitters and rendering, using a native operating system of the client, the content collected from each of the plurality of content emitters in separate windows on a display device of the client.

17. The method according to claim 1, wherein:
    each of the content emitters generates a window identifier in the content it emits for native rendering; and
    the executive uses the generated window identifier, upon receiving content emitted by any of the content emitters for native rendering, for locating a window uniquely associated with that content emitter and directing the received content to the located window.

18. A method of native content rendering, comprising:
    requesting, from at least one locally-executing content emitter, content for native rendering on a client using windowing support of an operating system of the client, wherein the at least one locally-executing content emitter is also capable of rendering content for aggregation and delivery to the client in an aggregated stream;
    receiving the requested content; and
    rendering the received content from each of the at least one locally-executing content emitter into distinct windows at the client using local controls provided by the windowing support of the operating system.

19. A system comprising a computer processor for executing of an executive on a client, the executive issuing requests to, and receiving responses from, one or more content emitters that are executing on the client to emit content for native rendering, wherein at least one of the content emitters is also capable of executing remotely to emit content for delivery to the client in an aggregated stream.

20. The system according to claim 19, wherein the content emitters are portlets.

21. The system according to claim 19, wherein:
    the content emitters emit content in a first format adapted for the native rendering when executing on the client; and
    the content emitters emit content in a second format adapted for rendering with a client browser when executing remotely.

22. The system according to claim 19, further comprising a renderer for rendering, at the client, the content emitted by at least one of the content emitters that are executing on the client.

23. The system according to claim 22, wherein the renderer further comprises a mapper for mapping, by the executive, the emitted content to operating system capabilities on the client for the rendering.

24. The system according to claim 22, wherein the renderer uses windowing features of an operating system on the client for the rendering.

25. The system according to claim 22, wherein:
    a plurality of the content emitters are executing on the client to emit the content for native rendering;
    the renderer renders the content emitted by at least two of the plurality of content emitters that are executing on the client; and the renderer displays the content emitted by each of the at least two content emitters in distinct frames of a window.

26. The system according to claim 22, wherein:
a plurality of the content emitters are executing on the client to emit the content for native rendering;
the renderer renders the content emitted by at least two of the plurality of content emitters that are executing on the client; and
the renderer independently displays the content emitted by each of the at least two content emitters in a separate window.

27. The system according to claim 19, wherein the executive notifies the content emitters whether to emit content for the native rendering or for delivery in the aggregated stream.

28. The system according to claim 19, wherein:
a plurality of the content emitters are executing on the client to emit the content for native rendering; and
the executive operates as a client-side portal for collecting content received from each of the plurality of content emitters for rendering, using a native operating system of the client, into separate child windows of a parent frame.

29. The system according to claim 19, wherein:
a plurality of the content emitters are executing on the client to emit the content for native rendering; and
the executive operates as a client-side portal for collecting content received from each of the plurality of content emitters and rendering, using a native operating system of the client, the content collected from each of the plurality of content emitters in separate windows on a display device of the client.

30. The system according to claim 19, wherein:
each of the content emitters generates a window identifier in the content it emits for native rendering; and
the executive uses the generated window identifier, upon receiving content emitted by any of the content emitters for native rendering, for locating a window uniquely associated with that content emitter and directing the received content to the located window.

31. A system for native content rendering, the system comprising a computer comprising a processor and a memory storing instructions which are executable, using the processor, to perform:
requesting, from at least one locally-executing content emitter, content for native rendering on a client using windowing support of an operating system of the client, wherein the at least one locally-executing content emitter is also capable of rendering content for aggregation and delivery to the client in an aggregated stream;
receiving the requested content; and
rendering the received content from each of the at least one locally-executing content emitter into distinct windows at the client using local controls provided by the windowing support of the operating system.

32. A computer program product for executing native content emitters, the computer program product embodied on at least one computer-readable storage media and comprising computer-readable instructions for executing, on a client, an executive that issues requests to, and receives responses from, one or more content emitters that are executing on the client to emit content for native rendering, wherein at least one of the content emitters is also capable of executing remotely to emit content for delivery to the client in an aggregated stream.

33. The computer program product according to claim 32, wherein the content emitters are portlets.

34. The computer program product according to claim 32, wherein:
the content emitters emit content in a first format adapted for the native rendering when executing on the client; and
the content emitters emit content in a second format adapted for rendering with a client browser when executing remotely.

35. The computer program product according to claim 32, further comprising computer-readable instructions for rendering, at the client, the content emitted by at least one of the content emitters that are executing on the client.

36. The computer program product according to claim 35, wherein the computer-readable instructions for rendering further comprise computer-readable instructions for mapping, by the executive, the emitted content to operating system capabilities on the client.

37. The computer program product according to claim 35, wherein the rendering uses windowing features of an operating system on the client for the rendering.

38. The computer program product according to claim 35, wherein:
a plurality of the content emitters are executing on the client to emit the content for native rendering;
the rendering renders the content emitted by at least two of the plurality of content emitters that are executing on the client; and
the rendering displays the content emitted by each of the at least two content emitters in distinct frames of a window.

39. The computer program product according to claim 35, wherein:
a plurality of the content emitters are executing on the client to emit the content for native rendering;
the rendering renders the content emitted by at least two of the plurality of content emitters that are executing on the client; and
the rendering independently displays the content emitted by each of the at least two content emitters in a separate window.

40. The computer program product according to claim 32, wherein the executive notifies the content emitters whether to emit content for the native rendering or for delivery in the aggregated stream.

41. The computer program product according to claim 32, wherein:
a plurality of the content emitters are executing on the client to emit the content for native rendering; and
the executive operates as a client-side portal for collecting content received from each of the plurality of content emitters for rendering, using a native operating system of the client, into separate child windows of a parent frame.

42. The computer program product according to claim 32, wherein:
a plurality of the content emitters are executing on the client to emit the content for native rendering; and
the executive operates as a client-side portal for collecting content received from each of the plurality of content emitters and rendering, using a native operating system of the client, the content collected from each of the plurality of content emitters in separate windows on a display device of the client.

43. The computer program product according to claim 32, wherein:
each of the content emitters generates a window identifier in the content it emits for native rendering; and
the executive uses the generated window identifier, upon receiving content emitted by any of the content emitters for native rendering, for locating a window uniquely associated with that content emitter and directing the received content to the located window.

44. A computer program product for native content rendering, the computer program product embodied on at least one computer-readable storage media and comprising computer-readable instructions for:

requesting, from at least one locally-executing content emitter, content for native rendering on a client using windowing support of an operating system of the client, wherein the at least one locally-executing content emitter is also capable of rendering content for aggregation and delivery to the client in an aggregated stream;

receiving the requested content; and rendering the received content from each of the at least one locally-executing content emitter into distinct windows at the client using local controls provided by the windowing support of the operating system.

* * * * *